(12) United States Patent
Maess et al.

(10) Patent No.: US 6,507,714 B1
(45) Date of Patent: *Jan. 14, 2003

(54) METHOD FOR THE IMPROVED ELECTROGRAPHIC PRINTING OF IMAGE DETAILS AND PRINTING DEVICE WHICH OPERATES ACCORDING TO THIS METHOD

(75) Inventors: Volkhard Maess, Erding (DE); Martin Schleusener, Zorneding (DE)

(73) Assignee: Oce Printing Systems GmbH, Poing (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/868,867
(22) PCT Filed: Dec. 21, 1999
(86) PCT No.: PCT/EP99/10246
§ 371 (c)(1), (2), (4) Date: Aug. 6, 2001
(87) PCT Pub. No.: WO00/38019
PCT Pub. Date: Jun. 29, 2000

(30) Foreign Application Priority Data

Dec. 21, 1998 (DE) .......................................... 198 59 093

(51) Int. Cl.[7] .................... G03G 15/00; G03G 15/043
(52) U.S. Cl. ............................................ 399/51
(58) Field of Search ............... 399/44, 50, 51, 399/128

(56) References Cited

U.S. PATENT DOCUMENTS

| 4,709,250 A | | 11/1987 | Takeuchi .................... 347/131 |
| 4,982,232 A | * | 1/1991 | Naito .......................... 399/51 |
| 5,153,609 A | | 10/1992 | Ando et al. ................. 347/129 |
| 5,767,888 A | | 6/1998 | Schleusener et al. ..... 399/55 X |
| 5,797,064 A | * | 8/1998 | Raj et al. .................. 399/51 X |
| 5,950,039 A | * | 9/1999 | Kawai et al. ................. 399/44 |
| 5,966,558 A | * | 10/1999 | Kikui .......................... 399/44 |
| 6,006,047 A | * | 12/1999 | Mara et al. ............... 399/51 X |
| 6,167,210 A | * | 12/2000 | Maess et al. ................. 399/50 |

FOREIGN PATENT DOCUMENTS

| DE | 195 09 852 C2 | | 9/1995 |
| JP | 6-230642 | * | 8/1994 |
| WO | WO 97/37285 | | 10/1997 |

* cited by examiner

*Primary Examiner*—Fred L Braun
(74) *Attorney, Agent, or Firm*—Schiff Hardin & Waite

(57) ABSTRACT

A method for operating an electrographic printer or copier includes determining an adapted exposure energy before the start of the printing process. To this end, a portion of the image elements on a charged photoconductor region is exposed to a predetermined exposure energy. The other portion of the image elements on the photoconductor region is not exposed. A raster parameter which takes the ratio between exposed and unexposed image elements into account is used during the determination of the adapted exposure energy. A printer or copier apparatus for carrying out the method is also provided.

11 Claims, 6 Drawing Sheets

Figure 1:
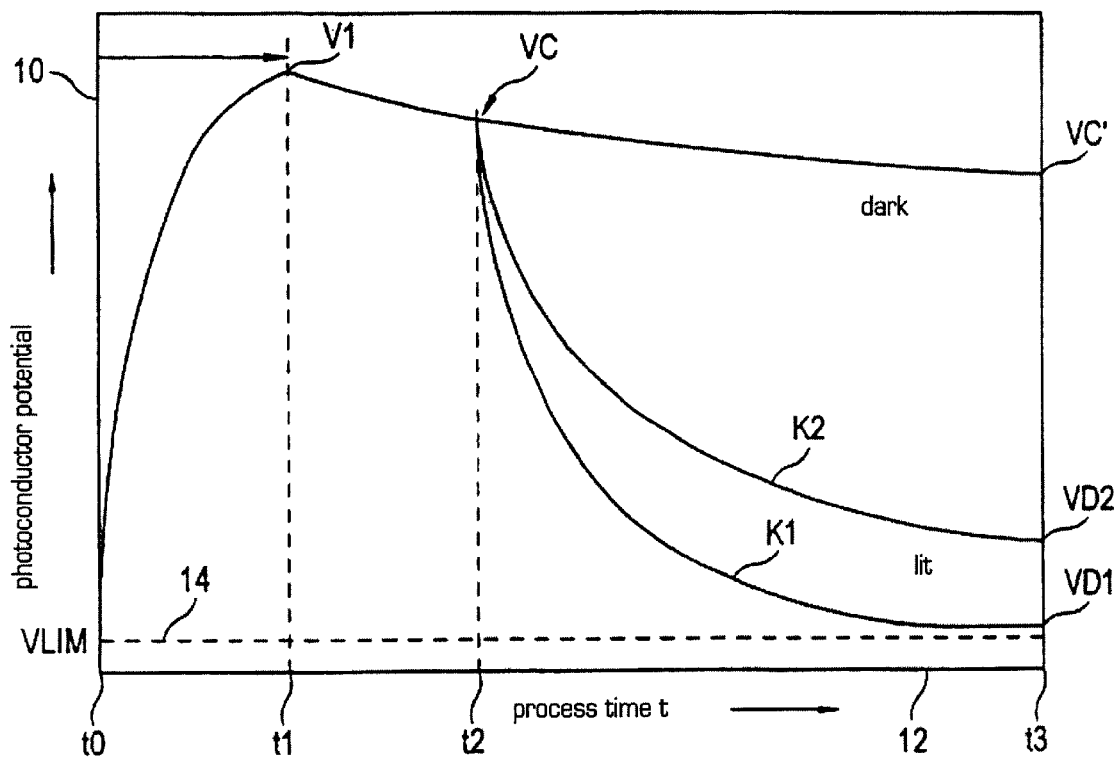

$$K(V_{DR}, T, H, F_R) := \frac{1}{T \cdot HS} \cdot \ln\left[\frac{F_R \cdot (V_C - V_{LIM})}{V_{DR} - (1 - F_R) \cdot V_C - F_R \cdot V_{LIM})}\right] \quad [1]$$

$$HA(V_{DR}, K, T, F_R) := \frac{1}{T \cdot K} \cdot \ln\left[\frac{F_R \cdot (V_C - V_{LIM})}{V_{DR} - (1 - F_R) \cdot V_C - F_R \cdot V_{LIM})}\right] \quad [2]$$

with
- $V_C$: photoconductor charge potential in V
- $V_{DR}$: photoconductor raster area discharge potential in V
- $V_{LIM}$: lowest obtainable discharge potential in V
- HS, HA: illumination in µWs/cm²
- T: photoconductor temperature in °C
- K: photoconductor sensitivity factor   r in cm²/(µWs·°C)
- $F_R$: raster factor

Fig.5

METHOD FOR THE IMPROVED ELECTROGRAPHIC PRINTING OF IMAGE DETAILS AND PRINTING DEVICE WHICH OPERATES ACCORDING TO THIS METHOD

The invention is directed to a method for the operation of an electrophotographic printer or copier device. The invention is also directed to a printer or, respectively, copier for the implementation of the method. This printer is explained later. Methods are known wherein a charged photoconductor region is illuminated with a predetermined illumination energy by an illumination device. The electrical potential on the photoconductor region is acquired after the illumination. Taking the acquired potential into consideration and on the basis of an approximation for the current characteristic of the photoconductor, an adapted illumination energy is determined that opposes the influence of deviations of the current characteristic of the photoconductor from a rated characteristic on the printing event.

For example, the characteristic of the photoconductor deviates from the rated characteristic due to temperature changes, wear or aging of the photoconductor. Given replacement of the photoconductor, there are also deviations in the characteristics to be attributed to production tolerances.

A method for determining the illumination energy is explained in DE 196 12 637. The known type of illumination control only allows a balancing or, respectively, a weakening of the effects of the deviating characteristic in view of solid white or, respectively, black surfaces. The quality of finer image details is not designationally influenced.

DE 195 09 852 C2 discloses a method for the control of the image quality wherein the quality of fine image details is acquired in predetermined standard patterns with the assistance of an optical sensor or of a potential sensor and is subsequently controlled by modifying parameters of the printing event. The sensor must thereby acquire the print quality of individual image features. The type of control of the parameters is only specified in general.

An object of the invention is to specify a method for the operation of an electrophotographic printer device wherein large surfaces and fine details in the print image as well can be printed with high print quality even given an altered characteristic of the photoconductor. A further object of the invention is to specify a printer or, respectively, copier device that prints large surfaces and fine details with high print quality even given an altered characteristic.

This object is achieved by a method having the method steps recited in patent claim 1. Developments of this method are recited in the subclaims dependent on claim 11.

The inventive method proceeds from the perception that variations in the discharge behavior of the photoconductor lead to variations of the electrical field above the photoconductor. The field above the photoconductor attracts the toner particles and therefore influence the image development. An approximately constant field strength that is only defined by the difference in potential between the photoconductor surface and the developer station prevails on photoconductor surfaces that correspond to larger white or, respectively, black image areas. In addition to being dependent on said difference in potential, the electrical field on photoconductor surfaces that correspond to fine image features, for example thin lines, discrete and raster dots, is also dependent in a complicated way on the geometrical shape of the details and on the physical properties of the photoconductor. This means that variations of the photoconductor properties influence the inking of large areas and fine image details in a different way.

In the inventive method, only a first part of the image features of a charged photoconductor region is illuminated with a predetermined illumination energy. The other part of the image features of the photoconductor region employed for the determination of the adapted illumination energy is not illuminated or, respectively, is illuminated with a significantly lower illumination energy. The ratio of the plurality of the image features of the first part to the plurality of image features of the second part defines a raster parameter. This raster parameter is employed in the determination of the adapted illumination energy. The high print quality of large areas and fine image details given different photoconductor characteristics in the inventive method is achieved in that the potential profile of an image detail is matched to a target form by modifying the illumination. The acquisition of the potential of individual picture elements, however, is avoided because a region composed of a plurality of image features, namely of the image features of both parts, is employed in the inventive method for measuring the potential with the assistance of a sensor that integrates over the area. The measurement of potential ensues simply and exactly given an adequately large, selected region of, for example, 25 mm².

In a development of the inventive method, the image features of the first part and the image features of the other, second part as well are approximately uniformly distributed on the photoconductor region, for example like a checkerboard or stripe-shaped. As a result of this arrangement of the image features, an average field strength that is very well-suited for the determination of the adapted illumination energy is acquired in the measurement of the potential. A uniform distribution of potential arises on the photoconductor region, so that slight positional deviations of the potential sensor have no influence on the measured result.

In a next development, a multi-level character generator as disclosed, for example, in U.S. Pat. No. 5,767,888 is employed for the illumination. The multi-level character generator is realized either with the assistance of an LED line, as in said Letters Patent, or by employing a multi-level laser that scans the photoconductor.

The invention is also directed to a printer for the implementation of the inventive method. The aforementioned technical effects therefore also apply to the inventive printer.

Figure 2:
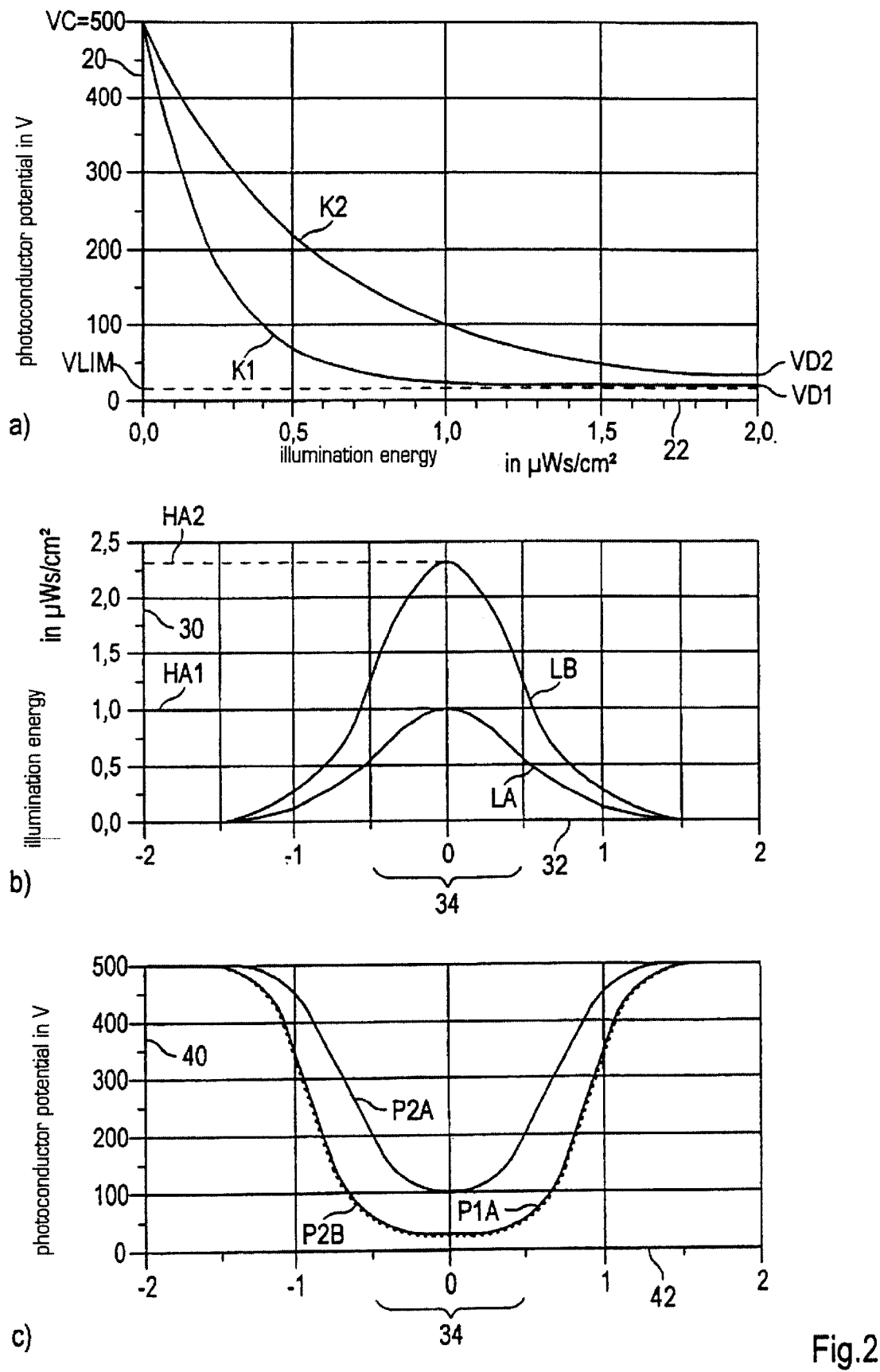
Figure 3:
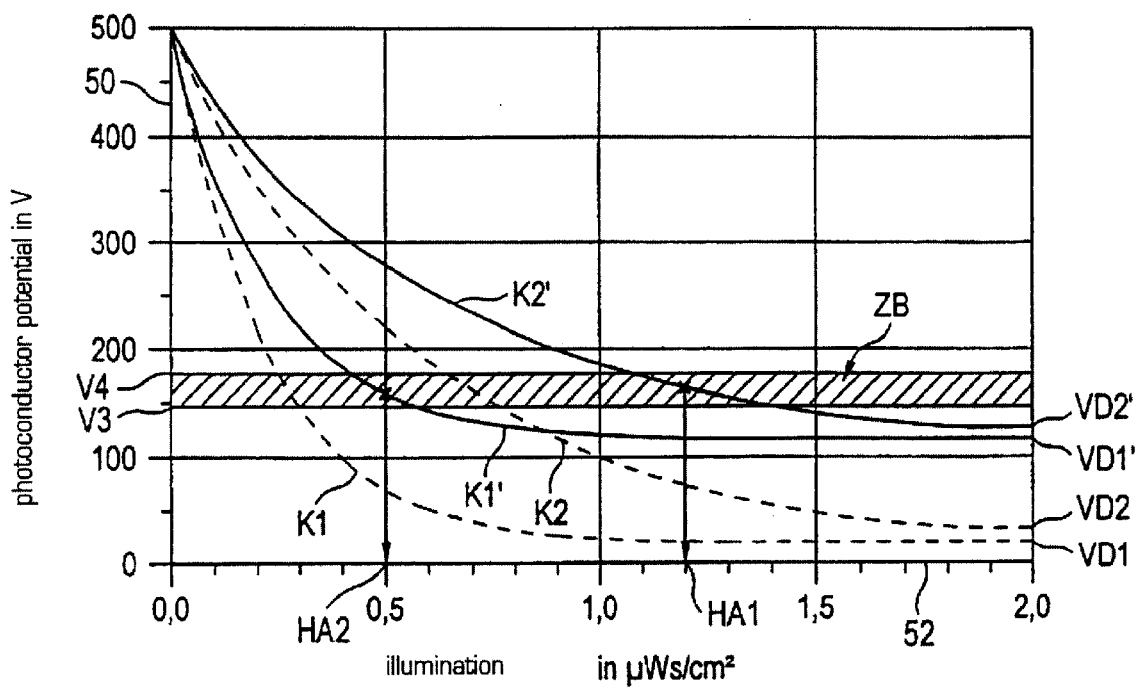
Figure 4:
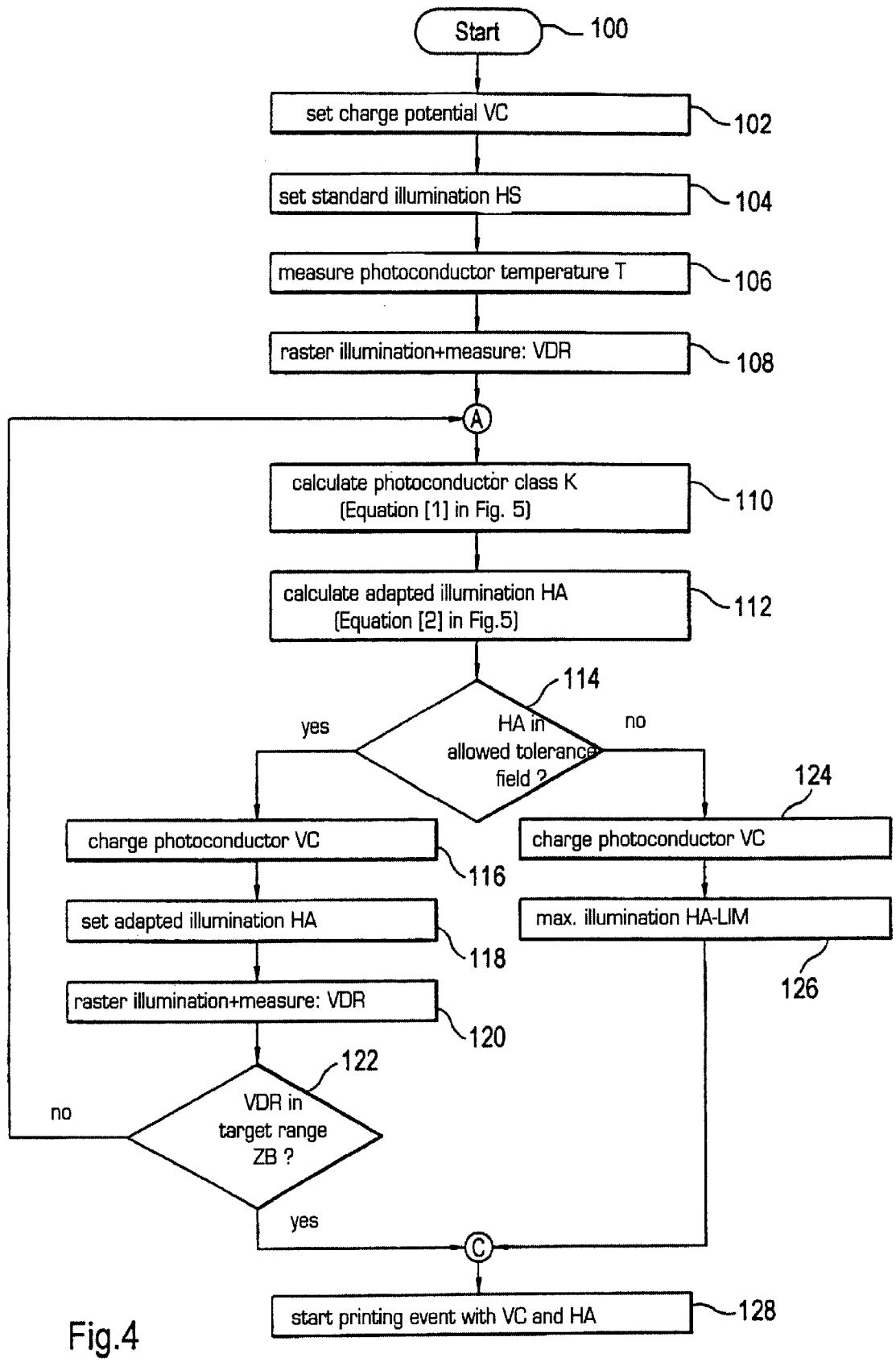
Figure 6:
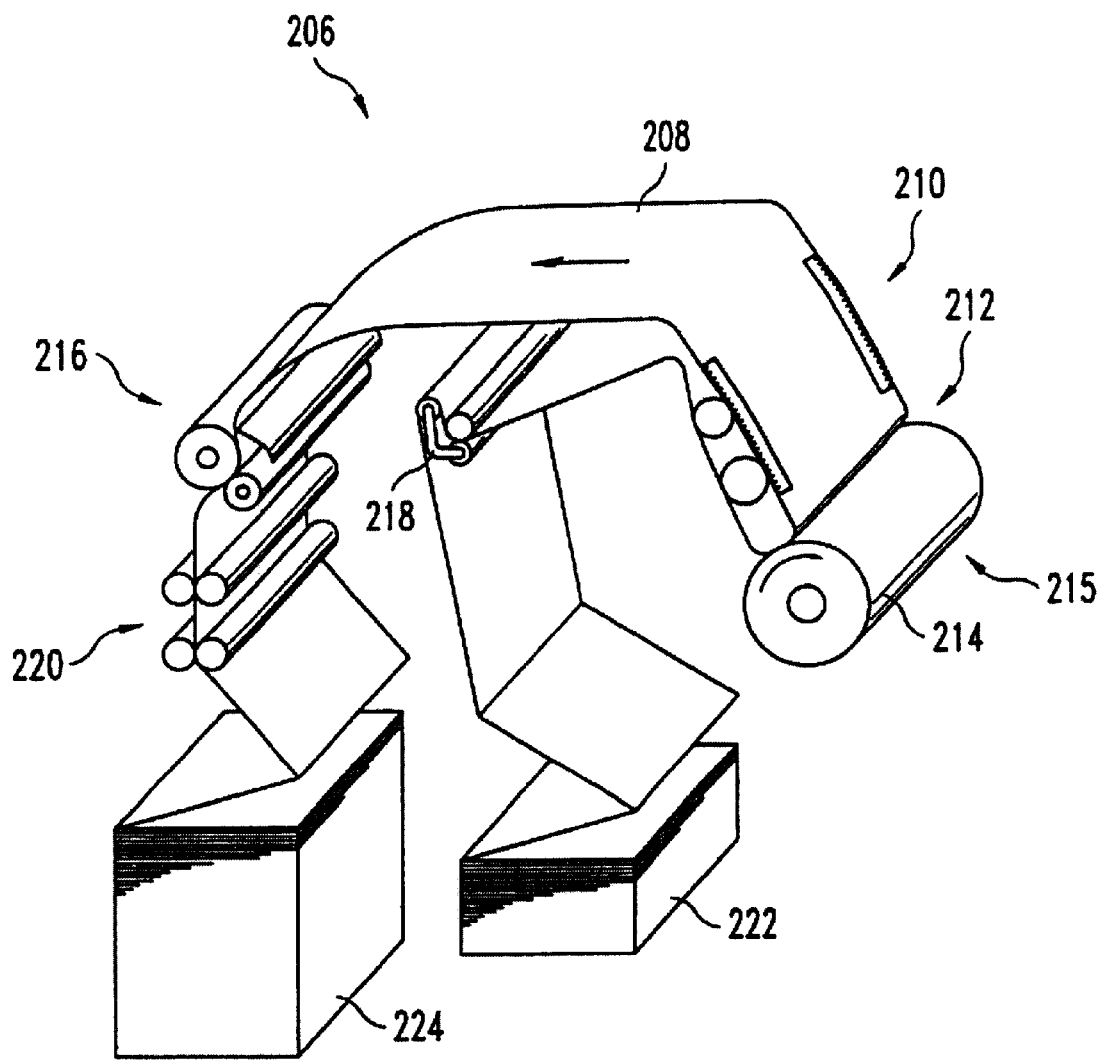

Exemplary embodiments of the invention are explained below on the basis of the attached drawings. Shown therein are:

FIG. 1 a potential/time diagram of different characteristics of a photoconductor;

FIGS. 2a–2c diagrams for illustrating the influence of different characteristics of the photoconductor on the development process;

FIG. 3 a potential/illumination energy diagram with a target region for determining an adapted illumination energy;

FIG. 4 a flowchart of the method steps to be implemented in the determination of the adapted illumination energy; and FIG. 5 equations employed in the determination of the adapted illumination energy; and FIG. 6 a schematic illustration of a printer device.

FIG. 1 shows a potential/time diagram of two characteristics K1 and K2 of a photoconductor. The potential is shown on the ordinate 10 and the time t is shown on the abscissa 12. The charging of the photoconductor is begun at a time t0.

The potential on the photoconductor has its highest charge potential V1 by a time t1.

During the time lying between the point in time t1 and a point in time t2, the charge on the photoconductor, due to ambient influences, decreases to a charge potential VC that is somewhat lower than the charge potential V1. The photoconductor is illuminated from the time t2. The result of the illumination is that the potential on the photoconductor exponentially sinks from the charge potential VC to a discharge potential VD1 by a time t3 according to characteristic K1. When, for example due to a reduced ambient temperature, the photoconductor has the characteristic K2, the potential on the photoconductor drops exponentially between the points in time t2 and t3 from the charge potential VC to a discharge potential VD2 that lies above the potential VD1. When the photoconductor is not illuminated, than it has a charge potential VC' on its surface at time t3 that is somewhat lower than the charge potential VC.

Dependent on the characteristics K1 or K2, different discharge potentials VD1 or, respectively, VD2 for the start of development are present on the photoconductor after the illumination at time t3. The different curve of the characteristics K1 and K2 of a photoconductor, for example, is also dependent on the age of the photoconductor. The deviation of the characteristics K1 and K2, however, also appears given a change of the photoconductor or, respectively, when comparing the photoconductors of two different printers. In this case, manufacture-conditioned fluctuation as well as the quality of the photoconductor have an additional influence on the deviation of the characteristics K1 and K2 from one another.

The characteristic belongs to a photoconductor that is relatively light-insensitive. In contrast thereto, the characteristic K1 describes a photoconductor that is more sensitive to light than the photoconductor described by the characteristic K2. For example, one photoconductor becomes more sensitive to light as it increasingly heats.

The different discharge potentials VD1 and VD2 lead to different print qualities when the influence of the characteristics K1 or, respectively, K2 on the printing event is not taken into consideration. A broken line 14 illustrates the lowest occurring discharge potential VLIM of the photoconductor with the characteristics K1 or, respectively, K2.

FIGS. 2a through 2c show diagrams for illustrating the influence of the characteristics K1 and K2 on the development process. FIG. 2a shows a potential/illumination energy diagram for the characteristics K1 and K2. The potential on the photoconductors is shown in V (volts) on the ordinate 20. The illumination energy is shown in $\mu Ws/cm^2$ on the abscissa 22. The potential on the photoconductors with the characteristics K1 or, respectively, K2 drops according to a descending exponential function from a potential of 500 volts to the discharge potentials VD1 or, respectively, VD2 given an illumination energy of 2.0 $\mu Ws/cm^2$.

FIG. 2b shows an illumination energy/location diagram wherein the illumination energy in $\mu Ws/cm^2$ is shown on the ordinate 30 and distance in pixels from a reference pixel 34 is shown on the abscissa 32. A light distribution LA is emitted by an LED (light emitting diode; not shown) in order to illuminate the reference pixel 34 at the reference position 0. The light distribution LA has the shape of a Gaussian bell whose edge regions cover neighboring pixels of the reference pixel 34.

A light distribution LB is generated in order to illuminate the reference pixel 34 with a higher illumination energy compared to the illumination energy of the light distribution LA. The light distribution LB is likewise shaped like a Gaussian bell. The illumination energy HA2 in the center of the reference pixel 34 given the light distribution LB is more than twice as high as an illumination energy HA1 in the center of the reference pixel 34 given the light distribution LA, namely about 2.3 $\mu Ws/cm^2$ compared to 1 $\mu Ws/cm^2$.

FIG. 2c shows a potential/location diagram wherein the potential on the surface of the photoconductor is shown in volts on the ordinate 40 and the spacing from the reference pixel 34 is shown on the abscissa 42. A trough-like potential distribution P1A having a shape like a Gaussian bell arises in the region of the reference pixel 34 when the photoconductor has the characteristic K1 and is illuminated with the light distribution LA. The potential distribution P1A leads to a high-quality print image. When, in contrast, the photoconductor has the characteristic K2, then a potential distribution P2A arises in the region of the reference pixel 34 given an illumination according to the light distribution LA. The potential distribution P2A is similar to the potential distribution P1A but has a minimum value lying about 80 volts above the minimum value of the potential distribution P1A. A print image with poor quality would derive due to this deviation of the potential distribution P2A compared to the potential distribution P1A. This is prevented in that, given the presence of the characteristic K2, the light distribution LB is employed for the illumination of the reference pixel 34, whereby a potential distribution P2B indicated by a dotted curve arises. The potential distribution P2B essentially agrees with the potential distribution P1A. Even given employment of a photoconductor with the characteristic K2, thus, the print image continues to have a uniformly good print quality. The illumination energy HA2 in the light distribution LB is therefore referred to as adapted illumination energy HA2.

Particularly given employment of a multi-level character generator as disclosed in U.S. Pat. No. 5,767,888, it is important to achieve a predetermined distribution of potential so that the print quality is high, particularly given rastered half-tone presentation.

FIG. 3 shows a potential/illumination energy diagram with a target region ZB shown hatched that is employed in the determination of the adapted illumination energy HA1 or, respectively, HA2. The potential on the photoconductor is shown in volts on the ordinate 50. The abscissa 52 shows the illumination energy in $\mu Ws/cm^2$ with which the photoconductor is illuminated.

The adapted illumination energy HA1 or, respectively, HA2 is determined in that a sub-region of the photoconductor is illuminated according to a predetermined raster. The ratio of the plurality of illuminated image features in the photoconductor region under consideration to the plurality of non-illuminated image features defines a raster factor FR to which 0<FR<1 applies. Typically, a raster factor of 0.5 is employed. For example, a raster factor of 0.5 derives when the image features (pixels) in a 5 mm×5 mm region and having a size of, for example, 42 $\mu$m are illuminated or, respectively, not illuminated in the fashion or a checkerboard pattern given an image resolution of 600 dpi (dots per inch). The potential on the region of 5 mm×5 mm is subsequently acquired with a potential sensor that has a coverage area of likewise approximately 25 mm$^2$ It is not the characteristics K1 or, respectively, K2 but the characteristics K1' or, respectively, K2' that are employed for determining the adapted illumination energy HA1 or, respectively, HA2. The characteristic K1' takes the influence of the raster factor FR when illuminating a photoconductor with the characteristic K1 into consideration. Likewise, the characteristic K2' takes the influence of the raster factor FR when illuminating a photoconductor with the characteristic K2 into consideration.

The raster factor FR leads to a compression of the characteristics K1 or, respectively, K2 in the direction of the ordinate 50. As a result thereof, the discharge potential VD1 or, respectively, VD2 shifts toward a higher discharge potential VD1' or, respectively, VD2'. The employment of the characteristics K1' or, respectively, K2' in the determination of the adapted illumination energy HA1 or, respectively, HA2 assures that it is not only large areas but also fine image details that can be printed with high print quality.

In order to determine the adapted illumination energy HA1 or, respectively, HA2, the current characteristic of the photoconductor K1' [sic] or, respectively, K2' [sic] is defined by an approximation, as shall be explained below. Subsequently, the adapted illumination energy HA1 or, respectively, HA2 is defined such that the potential belonging to the illumination energy HA1 or, respectively, HA2 lies between potentials V3 and V4 that limit the target region ZB. The method that is thereby implemented is likewise explained below.

FIG. 4 shows a flowchart for the method steps to be implemented in the determination of the adapted illumination energy HA. The method begins in a step 100. The photoconductor is charged to the charge potential VC in a step 102. Subsequently, a standard illumination energy HS of, for example, 1 $\mu$Ws/cm$^2$ is set in a step 104. The temperature T of the photoconductor is acquired in a following method step 106. Subsequently, the photoconductor region is illuminated with the predetermined raster and the standard illumination energy HS in a method step 108. Subsequently, what integral raster potential VDR is adjacent on the photoconductor region is measured with a potential sensor.

In a step 110, a photoconductor class K is subsequently calculated according to the following equation:

$$K(VDR, T, H, FR) := \frac{1}{T \cdot HS} \cdot \ln\left[\frac{FR \cdot (VC - VLIM)}{VDR - (1 - FR)VC - FR \cdot VLIM}\right], \quad (1)$$

wherein

VC is the charge potential of the photoconductor in volts,
VDR is the discharge potential of the photoconductor raster area in volts,
VLIM is the lowest obtainable discharge potential in volts,
HS is the illumination energy in $\mu$Ws/cm$^2$,
T is the temperature of the photoconductor in ° C.,
K is the photoconductor class in cm$^2$/($\mu$Ws° C.),
FR is the raster factor, and
ln is the natural logarithm.

In a following step 112, the adapted illumination energy HA is calculated according to the following equation:

$$HA(VDR, K, T, FR) := \frac{1}{T \cdot K} \cdot \ln\left[\frac{FR \cdot (VC - VLIM)}{VDR - (1 - FR) \cdot VC - FR \cdot VLIM}\right], \quad (2)$$

whereby the quantities employed correspond to those from equation (1). Equation (2) arises by converting equation (1) according to the illumination energy HS. The relationship indicated by equation (2) is a first approximation for the characteristic K1' or, respectively, K2'.

A check is carried out in a step 114 as to whether the adapted illumination energy HA lies in a permitted range. When this is this case, then the photoconductor is recharged to the predetermined charge potential VC in a step 116. Subsequently, the adapted illumination energy HA that has just been determined is set, see step 118. A raster illumination is subsequently implemented with this adapted illumination energy HA in a step 120, whereby the photoconductor region under consideration is again illuminated with the predetermined raster. The potential VDR on the photoconductor region is measured after the illumination.

A check is carried out in a step 122 as to whether the measured potential VDR lies in the target region ZB. When this is not yet the case, then the method is continued in the step 110. The method is now in a loop composed of the method steps 110 through 122 that is run in an iteration process. For calculating the photoconductor class in step 110, the respectively most recently determined, adapted illumination energy HA is thereby employed in equation (1) instead of the standard illumination energy HS. The loop composed of the method steps 110 through 122 is exited either in the step 114 or the step 122. When an adapted illumination energy HA determined according to equation (2) lies outside the permitted range, then the method step 114 is immediately followed by a method step 124 wherein the photoconductor is charged to the predetermined potential VC. In a following method step 126, a predetermined, maximum illumination energy HA-LIM is set as adapted illumination energy. Subsequently, the printing event is begun in a step 128, whereby the charge potential VC and the illumination energy HA-LIM is [sic] employed.

When, in contrast, the loop composed of the method steps 110 through 122 is exited in step 122 because the discharge potential VDR lies within the raget region ZB, then the method step 122 is immediately followed by the method step 128.

The printing event is implemented with the charge potential VC and with the illumination energy HA most recently calculated in the step 112.

FIG. 5 shows the equations (1) and (2) for the photoconductor class K and for the adapted illumination energy HA. These equations have been explained above in conjunction with FIG. 4.

The entire procedure for adjusting the potential in the target region ZB, see FIG. 3, is expediently implemented in a continuous sequence after the activation of the printer, following printing pauses in the standby mode, after a change of photoconductor and/or during ongoing printer operation. In another exemplary embodiment, the adapted illumination energy is implemented at suitable time intervals, for example every 5 minutes.

In a further exemplary embodiment, wherein the printer operation is interrupted relatively seldom, a fine adaptation of the illumination energy HA is implemented between two regulating events according to FIG. 4 in that the temperature T of the photoconductor is measured and a new, adapted illumination energy HA is subsequently calculated only according to equation (2). An interpolation is thus achieved without raster illumination and potential measurement.

In the calculation of the adapted illumination energy HA, either the indicated equations are directly employed or the method is simplified by employing allocation tables. The allocation tables are generated from the equations (1) and (2) before the beginning of the method for determining the adapted illumination energy HA and are stored in a memory of the printer.

Methods without iteration are also applied, the method steps 114 through 126 shown in FIG. 4 lacking therein. The steps 114 through 122 need not be implemented when the electrophotographic printing event has an adequate basic stability and the standard illumination HS is suitably selected.

FIG. 6 shows the schematic illustration of a high-performance printer device 206. The printer device 206 has a transport mechanism 210 that is arranged close to a deflection [sic] station 212 and conveys endless carrier material through the transfer printing station 212, wherein the charge image applied on a photoconductor drum 214 with the assistance of an illumination device 215 and inked with toner is transferred onto the endless carrier material by means of a corona device (not shown). Subsequently, the endless carrier material is supplied to a fixing station 216 wherein the still smearable toner image is joined to the carrier material smudge-proof with the assistance of pressure and temperature. As viewed in the transport direction indicated by an arrow, a first deflection unit 218 is arranged preceding the transfer printing station 212, said first deflection unit 218 conducting the carrier material to the transfer printing station 212 and, in conformity with the selected printing mode, being capable of turning the carrier material over or merely displacing it laterally. A second deflection unit 216 is arranged following the fixing station 216 as viewed in transport direction. This second deflection unit 220 stacks the printed carrier material and can also supply the material to the first deflection unit, likewise dependent on the selected printing mode.

FIG. 6 shows the printer 206 in a first printing mode, the simplex mode, wherein a web section 208 of the endless carrier material is supplied from a stack 222 to the printing unit 212 by the first deflection unit 218. After the printing, the transport mechanism 210 transports the web section 208 in the direction of the fixing station 216, wherein the toner image is firmly joined to the carrier material. Subsequently, the second deflection unit 220 stacks the web section 208 on a second stack 224.

When, in one embodiment, a multi-level character generator is employed for the illumination, then the advantages achieved by the inventive method particularly come to bear because the print quality can be decisively enhanced precisely given a plurality of gray scale values or, respectively, color values. A multi-level character generator, for example, is disclosed in U.S. Pat. No. 5,767,888, which is herewith incorporated into the disclosure of the present application.

| List of Reference Characters | |
| --- | --- |
| 10 | ordinate, potential |
| 12 | abscissa, time t |
| V1 | charge potential |
| VC, VC' | charge potential |
| VD1, VD2 | discharge potential |
| 14 | broken line |
| VLIM | lowest obtainable discharge potential |
| 20 | ordinate, potential V |
| 22 | abscissa, illumination energy |
| 30 | ordinate, illumination energy |
| 32 | abscissa, location in pixels |
| LA, LB | light distribution |
| LED | light-emitting diode |
| 34 | reference pixel |
| 40 | ordinate, potential V |
| 42 | abscissa, location in pixels |
| P1A, P2A, P2B | potential distribution |
| HA1, HA2 | adapted illumination energy |
| ZB | target region |
| 50 | ordinate, potential V |
| 52 | abscissa, illumination energy |
| FR | raster factor |
| K1', K2' | modified characteristic |
| VD1', VD2' | modified discharge potential |
| HS | standard illumination energy |
| T | temperature |
| VDR | raster potential |
| K | photoconductor class |
| 100 | start |

| -continued | |
| --- | --- |
| List of Reference Characters | |
| 102 | set charge potential VC |
| 104 | set standard illumination HS |
| 106 | measure photoconductor temperature T |
| 108 | raster illumination + measurement |
| 110 | calculate photoconductor class K |
| 112 | calculate adapted illumination HA |
| 114 | in allowed tolerance field ? |
| 116 | charge photoconductor VC |
| 118 | set adapted illumination HA |
| 120 | raster illumination + measurement: VDR |
| 122 | in target region ZB ? |
| 124 | charge photoconductor VC |
| 126 | maximum illumination HA-LIM |
| 128 | start print event with VC and HA |
| 206 | printer device |
| 208 | web section |
| 210 | transport mechanism |
| 212 | transfer printing station |
| 214 | photoconductor drum |
| 115 | illumination device |
| 216 | fixing station |
| 218, 220 | deflection unit |
| 222, 224 | stack |

What is claimed is:

1. A method for operating an electrophotographic printer or copier device, comprising the steps of:
   illuminating a first part of image features on a charged photoconductor region with a predetermined illumination energy by an illumination device, a second part of the image features on the photoconductor region not being illuminated, determining a raster factor from a ratio of a number plurality of image features of the first part to a number of image features of the second part;
   acquiring an electrical potential of the photoconductor region after the illuminating step; and determining an adapted illumination energy on a basis of an approximation for a current characteristic of the photoconductor by taking the raster factor determined in said determining step and the electrical potential acquired in said acquiring step into consideration for a printing event, said adapted illumination energy opposing an influence of a deviation of a current characteristic of the photoconductor from a rated characteristic on the printing event.

2. A method as claimed in claim 1, wherein the image features of the first part and the image features of the second part as well are approximately uniformly distributed on the photoconductor region.

3. A method as claimed in claim 2, wherein said distribution is in one of a grid and stripe-shape.

4. A method as claimed in claim 1, wherein the raster factor is approximately 0.5.

5. A method as claimed in claim 1, wherein the adapted illumination energy HA is determined according to the following equation:

$$HA(VDR, K, T, FR) := \frac{1}{T \cdot K} \cdot \ln\left[\frac{FR \cdot (VC - VLIM)}{VDR - (1 - FR) \cdot VC - FR \cdot VLIM}\right], \quad (2)$$

wherein
   VC is the charge potential of the photoconductor in volts,
   VDR is the discharge potential of the photoconductor raster area in volts,
   VLIM is the lowest obtainable discharge potential in volts, HA is the illumination energy in $\mu Ws/cm^2$,
T is the temperature of the photoconductor in ° C.,
K is the photoconductor class in $cm^2/(\mu Ws° C.)$,
FR is the raster factor, and
ln is the natural logarithm.

6. A method as claimed in claim 5, wherein the photoconductor class K is determined according to the following equation:

$$K(VDR, T, H, FR) := \frac{1}{T \cdot HS} \cdot \ln\left[\frac{FR \cdot (VC - VLIM)}{VDR - (1 - FR)VC - FR \cdot VLIM}\right], \quad (1)$$

wherein
VC is the charge potential of the photoconductor in volts,
VDR is the discharge potential of the photoconductor raster area in volts,
VLIM is the lowest obtainable discharge potential in volts,
HS is the illumination energy in $\mu Ws/cm^2$,
T is the temperature of the photoconductor in ° C.,
K is the photoconductor class in $cm^2/(\mu Ws° C.)$,
FR is the raster factor.

7. A method as claimed in claim 6, further comprising the step of:
implementing an iteration for determination of the adapted illumination energy including utilization of a most recently determined adapted illumination energy.

8. A method as claimed in claim 1, further comprising the step of:
acquiring an average potential on the photoconductor region in the measurement of potential.

9. A method as claimed in claim 1, wherein a multi-level character generator is employed for the illuminating step.

10. An electrophotographic printer or copier device, comprising:
a photoconductor;
a charging device for charging the photoconductor;
an illumination device for image-related illumination of the photoconductor; and
a control unit that implements a method before beginning of a printing event, including a first part of an image features on a charged photoconductor region being illuminated with a predetermined illumination energy by the illumination device, a second part of the image features on the photoconductor region being illuminated with a lower illumination energy or not being illuminated, a raster parameter being determined from a ratio of a number of image features of the first part to a number of image features of the second part, an electrical potential of the photoconductor region being acquired after the illumination, and an adapted illumination energy is determined on the basis of an approximation for a current characteristic of the photoconductor, taking the identified raster parameter and an acquired potential for the printing event into consideration, the adapted illumination energy opposing the influence of a deviation of the current characteristic of the photoconductor from a rated characteristic on the printing event.

11. An electrophotographic printer or copier device as claimed in claim 10, wherein said illumination device includes a multi-level character generator.

* * * * *